United States Patent [19]
Brehmer et al.

[11] Patent Number: 5,251,236
[45] Date of Patent: Oct. 5, 1993

[54] FRACTIONAL RATE MODEM WITH TRELLIS

[75] Inventors: Linda S. Brehmer, St. Petersburg; Keith Souders, Tampa, both of Fla.

[73] Assignee: AT&T Paradyne Corporation, Largo, Fla.

[21] Appl. No.: 681,136

[22] Filed: Apr. 5, 1991

[51] Int. Cl.$^5$ .............................................. H04L 27/04
[52] U.S. Cl. ........................................ 375/59; 375/39; 371/43; 341/61
[58] Field of Search .................... 375/7, 8, 25, 121, 39, 375/59; 341/61, 141; 371/43, 44, 45

[56] References Cited
U.S. PATENT DOCUMENTS 4,993,046  2/1991  Saito et al. .............................. 375/39
5,008,902  4/1991  Key et al. ............................... 375/121
5,056,117  10/1991  Gitlin et al. ........................... 375/39
5,103,227  4/1992  Betts ...................................... 341/61

*Primary Examiner*—Stephen Chin
*Attorney, Agent, or Firm*—Kane, Dalsimer, Sullivan, Kurucz, Levy, Eisele and Richard

[57] ABSTRACT

A data transmitting QAM modem with partitions incoming data into unequal frames. Some of the bits in each frame are encoded using fractional rate encoding and then recombined the rest of the bits to form frames of equal bits. Trellis encoding is then performed on the frames of equal bits. Advantageously the number of points in the QAM constellation is also increased to an integer divisible by a power of 2 to reduce the complexity of fractional rate encoding.

11 Claims, 3 Drawing Sheets

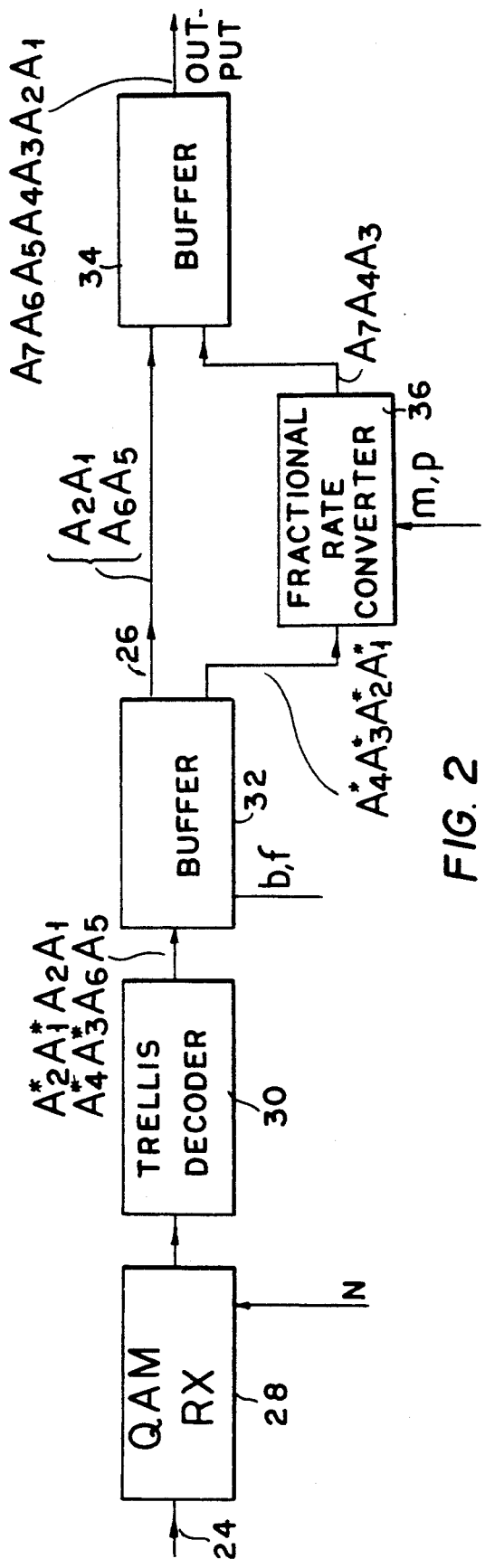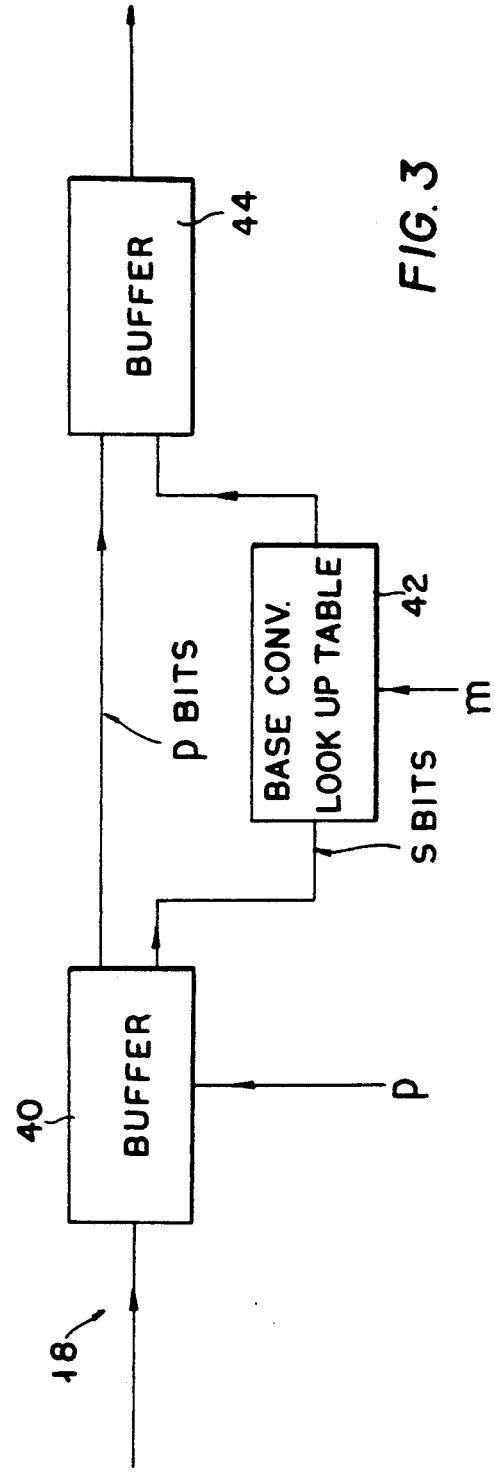

FRACTIONAL RATE MODEM WITH TRELLIS

RELATED APPLICATIONS

The subject matter of this application is related to commonly assigned application Ser. No. 588,650, filed Sep. 26, 1990, now entitled Modulus Converter for Fractional Bit Encoder.

BACKGROUND OF THE INVENTION

1. Field of the Invention

This invention relates to an apparatus and method for integrating fractional rate encoding with trellis coded modulation.

2. Background Art

In conventional, or non-fractional rate encoding, there is an integer number of bits per baud. This requires the number of possible configurations of a baud (i.e. the number of points in an "eye pattern" or constellation in quadrature amplitude modulation encoding) to be equal to 2 to the power of said integer.

For example, it is established convention to have 7 bits per baud (128 possible baud configurations) in a system employing a 16.8k transmission rate and to have 6 bits per baud (64 possible baud configurations) in a system employing 14.4k transmission rate.

However, when line impairments are encountered, the data rate and the bandwidth may be held constant with the amount of information transmitted reduced by reducing the number of bits per baud. As the number of bits per baud is reduced, the spacing of the data points in the constellation is increased, thereby compensating for the reliability lost due to line impairments. This reduced number of points in a constellation may be other than an integer power of 2, therefore a non-integer or fractional number of bits are transmitted per baud.

In commonly assigned patent application Ser. No. 588,652, filed Sep. 26, 1990, a modem is described which performs fractional rate encoding.

Trellis coded modulation, otherwise known as Viterbi encoding, is a forward error coding algorithm which involves the use of systematically redundant data bits to generate a preselected allowable number of data sets. Only predetermined transitions from one sequential group of bits (corresponding to bauds) to another are allowed. There is an inherent correlation between these redundant bits over consecutive bauds. At the receiver, each baud is tentatively decoded and then analyzed based on past history, and the decoded bits are corrected if necessary. It has been found that trellis encoding provides a gain of at least 4 db in the signal-to-noise ratio of the data signals received in wireline modem applications. This algorithm is disclosed in U.S. Pat. No. 4,077,021 to Csajka et al. Further, U.S. Pat. Nos. 4,709,377 to Martinez and Mack and 4,677,625 to Betts, Martinez and Bremer (citing CCITT study group XVII, Contribution No. D180, in October, 1983, entitled Trellis-Coded Modulation Scheme with 8-State Systematic Encoder and 90 Degree Symmetry for Use in Data Modems Transmitting 3-7 Bits per Modulation Interval), both commonly assigned herewith, disclose modifications to trellis encoding.

More specifically, as described in the aforementioned U.S. Pat. No. 4,077,021 patent, trellis coding involves subdividing a bit sequence into groups each consisting of r bits, expanding each r-bit group into an (r+1) bit group by a sequential coder with four internal states, and modulating a carrier signal to assume one out of $2^{r+1}$ discrete carrier signal values. The assignment between the expanded bit groups and the carrier signal values being so selected that $2^{r-1}$ carrier signal values correspond to each transition from one internal state of the coder to one of two possible follower states, and that these $2^{r-1}$ carrier signal values have a larger minimum distance from each other than the absolute minimum distance within the set of $2^r$ discrete signal values used in conventional non-redundantly coded transmissions.

However, the trellis coding algorithm described above is adapted to a modem integer, rather than fractional rate encoding. Classical trellis coding and classical fractional rate encoding are not easily integrate. More specifically, both methods require certain constraints on the resulting data. Fractional rate encoding requires that every baud of data be a valid digit in the specified base (i.e., the number of points in the constellation) while trellis encoding requires that every baud of data follow a sequence which is specified by a convolutional code. These two constraints operate on the same data, and heretofore, it has appeared that the two coding techniques are mutually exclusive.

Devising trellis codes in higher bases is unduly complex, does not take advantage of established algorithms, and is not feasible in modems of limited memory capacity. Similarly, the straightforward approach of encoding a fractional number of bits per baud into a subset of integer bits per baud by converting the bits in base two into an integer number of bits with a base equal to the number of bits in the constellation results in a run-time intensive system with the above algorithm coded in conjunction with the Trellis encoder.

OBJECTS AND SUMMARY OF THE INVENTION

It is therefore an objective of the present invention to integrate fractional rate encoding with trellis encoding in a modem communications system.

It is therefore a further objective of the present invention to employ existing trellis encoding algorithms without having to derive trellis encoding algorithms of a base equal to the number of points in a fractional rate encoding constellation.

It is a further objective of this invention to provide integration of the above encoding techniques with reasonable computational and memory requirements.

The present invention is a modem communications system which uses fractional rate encoding and trellis coded modulation. These two methods are made compatible by the use of a base conversion between the fractional rate encoding and the Trellis coded modulation.

BRIEF DESCRIPTION OF THE DRAWINGS

FIG. 2 shows a block diagram for a modem received in accordance with this invention;

FIG. 3 shows details of the fractional rate converter for FIGS. 1 and 2; and

DETAILED DESCRIPTION OF THE INVENTION

Figure 1:
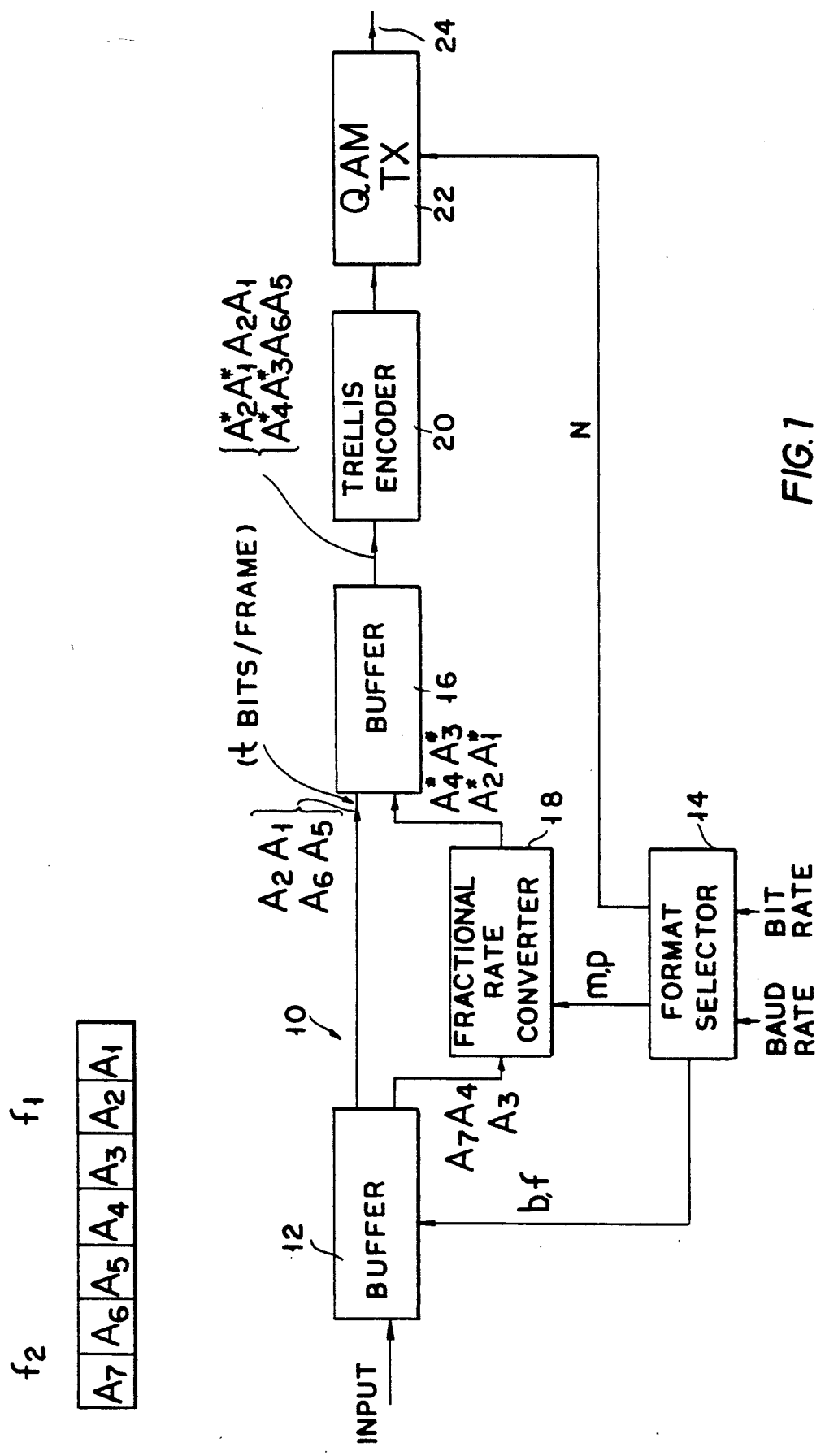
FIG. 1 shows a block diagram for a modem transmitter in accordance with this invention.

Referring now to the drawings, and more particularly FIG. 1, the transmitter section 10 of a modem constructed in accordance with this invention includes a buffer 12 which receives the data to be transmitted in the form of a serial bit stream. The transmitter also includes a format selector 14. The format selector 14 receives information identifying the desired baud rate and bit rate for the modem. From this information, the format selector calculate a number of coefficients required by the transmitter section and the receiver section of the modem. For example, the baud rate for a given channel may be 2,743 Hz. In order to transmit 9,600 bits/sec over this channel, approximately 9,600/2,743 or about 3.499 bits must be transmitted per each baud. This is accomplished in a fractional rate encoder by selecting two integers b and f such that the ratio of b/f approximates the number of required bits per baud. To reduce the complexity of calculations, the integers b and f should be as small as possible. For 9,600/2,742, the ratio b/f could be 7/2. The format selector 14 calculates coefficients b and f as described above and provides them to buffer 12.

The buffer 12 receives these coefficients and it partitions the incoming bit stream into frames. A unique characteristic of fractional rate encoding is that these frames do not contain the same number of bits. Rather, the bits are partitioned so that f sequential frames contain b bits. As shown in FIG. 1, for b=7 and f=2, each sequence of bits $A_1$ to $A_7$ are partitioned into two consecutive frames $f_1$ and $f_2$ having four and three bits respectively. A number of these bits are required for trellis encoding. A typical trellis encoding scheme requires two such bits. Therefore the buffer separates the two least significant bits from each frame( i.e. $A_1A_2$ and $A_5A_6$) sends them to a buffer 16. The remaining bits in each frame are sent to a fractional rate converter 18). The fractional rate converter 18 can be of the type described in co-pending commonly assigned application Ser. No. 588,652 described above. Alternatively, the converter can have the structure shown in FIG. 3 and described more fully below.

The converter 18 performs a base conversion on the data bits $A_7A_4A_3$ from buffer 12 to generate converted data bits $A^*_4A^*_3A^*_2A^*_1$. The converted bits are fed to a buffer 16 which combines these bits with the original least significant bits separated earlier to generate two frames of four bits each as shown in FIG. 1. These bits are fed to a trellis encoder 20 which performs the Viterbi algorithm on each frame of four bits. As previously mentioned, usually only the two least significant bits are used in this type of encoding. Since these bits were separated earlier they remain unaffected by the conversion required for fractional rate encoding. The trellis encoded frames are then sent to a QAM transmitter for transmission over a channel 24.

In addition to coefficients b and f, the format selector also generates coefficients m, the modulus used by converter 18, a coefficient p defining the number of bits Which require no conversion as described more fully below, and N, the number of signal constellation points required by the QAM transmitter for data transmission.

At the receiver section 26 of the modem (shown in FIG. 2) the operation is reversed. The digital signals from channel 24 are received by QAM receiver 28 and error correction is performed by trellis decoder 30. The decoder then generates frames of four data bits for each received baud. A buffer 32 again separates the two least significant bits of each frame and sends them to buffer. The remaining bits of two consecutive frames are combined and sent to a fractional rate converter 36. The converter 36 converts the received bits back to the original base sends these bits to buffer 34. Buffer 34 combines these bits with the bits received from the buffer 32 and generates an output bit stream identical to the bit stream input to the transmitter 10. The coefficients N, b, f, m, and p are provided to the respective elements of the receiver section by the format selector 14 as described.

The fractional rate encoding is performed as follows. In order to transmit b/f bits per frame, a signal constellation of at least $2^{b/f}$ are required. (The term signal constellation refers to the points used in a QAM data transmission scheme). For example for b/f=7/2=3.5 the number of constellation points is $2^{3.5}$ which may be rounded off to 12 As shown in co-pending application Ser. No. 588,652, the incoming data bits may be encoded by converting the 7 bits into base 12 and then transmitting the converted bits. This procedure may be very cumbersome especially when the base and the number of frames becomes very large. An alternate method can perform a similar function as follows. The ideal number of points obtained by the calculating $2^{b/f}$ is first rounded off to the nearest larger integer, and the integer so obtained is than increased to the nearest integer divisible by a preselected factor is a power of two such as four. As shall become apparent below, this factor is selected to reduce the number of bits which will require base conversion. For example, for b/f=21/5 the ideal number of points is $2^{21/4}=39$. If the number of points in the constellation is increase to 40, since $40=8\times5$ the conversion process is simplified if it is noted that since $8=2^3$, three bits in each frame need not be converted. Therefore, out of the 21 bits in 4 frames, $3\times4$ or 12 bits need not be converted, while the remaining 9 bits are converted to base 5. Of course, for the trellis encoder two bits per frame or 8 bits have already been removed by buffer 12. Accordingly, only four more bits need be converted.

Figure 4:
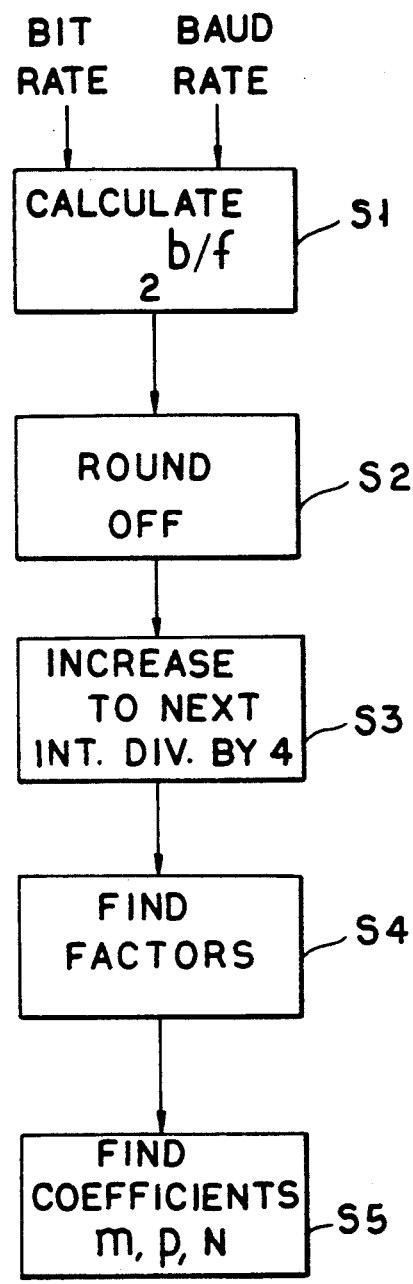
FIG. 4 shows a flow chart for a format selector.

This procedure is illustrated in FIGS. 3 and 4. As shown in FIG. 4, the format selector performs the following calculations: in step S1 the coefficients b and f are calculated from the desired bit and baud rates. In step S1 the ideal number of points $2^{b/f}$ is also calculated. In step S2, the result from step S1 is rounded off to nearest larger integer. In step S3 the integer from step S2 is increased to the nearest integer divisible by four. In step S4 the factors of this new integer are found. Finally in step S5 the format selector generates the coefficients m, p and N (in addition to coefficients b and f which have been calculated in step S1). N is the number of points in the signal constellation required for the QAM transmitter 22 to send the data. This number in general is larger than the integer number calculated in step S3 since additional bits are also generated by the trellis encoder.

As shown in FIG. 3, the fractional rate converter includes a buffer 40 which separates the bits from buffer 12 into a set of bits which do not have to converted and a set of bits that have to be converted to a new base m. Thus for b=21 and f=4, as discussed above m=5 and the total number of bits that need no conversion is 12. However since 2 bits per frame or 8 bits have already been separated by buffer 12, the net number p of bits which need no conversion is 12−2×4=4. Buffer 40 feeds the bits to be converted to a base conversion look up table 42. Using m as a module, the look table looks up outputs bits corresponding to the input from buffer 40. Buffer 44 combines the bits from buffer 40 and converter 42 to generate an output for buffer 16 (FIG. 1). The converter 36 in the receiver section 26 is structured similarly to converter 14, except that its look-up table converts the inputs back to the original basis.

Various coefficients for common bit rate and baud rate pairs are given in the following table, it being understood that other coefficients may be generated following the procedure outlined above.

TABLE I

| BIT RATE @ 2743 Hz | b/f | $2^{b/f}$ (ROUNDED) | I | Module m | Unconv. t = 2f | p | Convert. s = b − t − p |
|---|---|---|---|---|---|---|---|
| 9600 | 7/2 | 12 | $12 = 3 \times 2^2$ | 3 | 4 | 0 | 3 |
| 12000 | 35/8 | 21 | $24 = 3 \times 2^3$ | 3 | 16 | 8 | 11 |
| 14400 | 21/4 | 39 | $40 = 5 \times 2^3$ | 5 | 8 | 4 | 9 |
| 16800 | 49/8 | 70 | $72 = 9 \times 2^3$ | 9 | 16 | 8 | 25 |

Thus, increasing the number constellation points from the ideal number to the nearest integer divisible by four results in a simpler means of date rate conversion which could use look-up tables rather than complicated calculations and simultaneously allows the incorporation of a standard trellis encoding scheme. The disadvantages of increasing the signal constellation is a slight increase in the power output of the modem and a decrease in its performance however these advantages are clearly offset by the advantages as set forth above. Obviously numerous modifications can be made to the claims without departing from its scope as defined in the appended claims.

We claim:

1. A modem for data transmission at fractional data rates comprising:
   transmitter means including:
   buffer meas for receiving a stream of binary data, said buffer means being provided for partitioning said stream into frames of unequal number of bits and separating the bits of each frame into a first group and a second group of bits;
   fractional rate encoding means for receiving said first group and performing a fractional encoding thereon to generate a group of fractionally encoded bits; combining means for combining said group of fractionally encoded bits with said second groups into frames of equal number of bits;
   trellis encoding means for trellis encoding said frames of equal number of bits; and
   a transmitter section for transmitting the trellis encoded frames.

2. The mode of claim 1 wherein said trellis encoding means encodes the bits from said group of fractionally encoded bits.

3. A data transmitting device for transmitting signals corresponding to an incoming steam of bits, comprising:
   first buffer means for partitioning said stream into frames of unequal number of bits and for separating the bits of each frame into a first group and a second group of bits;
   fractional encoding means for receiving the first group of bits of each frame and performing fractional encoding to generate a group of fractionally encoded bits;
   second buffer means for combining said second group of bits with said group of fractionally encoded bits to form frames of equal number of bits;
   trellis encoding means for trellis encoding the frames from said second buffer means; and
   transmitting the trellis encoded frames.

4. The transmitter of claim 3, wherein said fractional rate encoding means includes:
   first fractional rate buffer means for separating the bits from said first group into unconverted bits and other bits;
   base conversion means for performing a base conversion on said other bits to generate converted bits; and
   second fractional rate buffer means for combining said unconverted and converted bits into frames.

5. The transmitter of claim 4 wherein said base conversion means includes a look-up table.

6. The transmitter of claim 3 further including format selector means for selecting the number of bits in said first and second group.

7. The transmitter of claim 3 wherein said transmitter section includes quadrature amplitude modulation encoding means.

8. The transmitter of claim 6 wherein said transmitter section includes quadrature amplitude modulation encoding means.

9. The transmitter of claim 8 wherein format selector means is further provided to select an ideal number of points defining the quadrature amplitude modulation constellation for said quadrature amplitude modulation encoder.

10. The transmitter of claim 9 wherein said format selector means is further adapted to increase said ideal number to an integer having a preselected factor.

11. The transmitter of claim 10 wherein said preselected factor is a power of 2.

* * * * *